(12) United States Patent
Han et al.

(10) Patent No.: US 10,261,612 B2
(45) Date of Patent: Apr. 16, 2019

(54) APPARATUS AND METHOD FOR RECOGNIZING PROXIMITY MOTION USING SENSORS

(71) Applicant: Samsung Electronics Co., Ltd., Suwon-si (KR)

(72) Inventors: Seung Ju Han, Seoul (KR); Joon Ah Park, Seoul (KR); Hyun Surk Ryu, Hwaseong-si (KR); Du Sik Park, Suwon-si (KR); Ki Myung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 307 days.

(21) Appl. No.: 14/150,051

(22) Filed: Jan. 8, 2014

(65) Prior Publication Data

US 2014/0240248 A1    Aug. 28, 2014

(30) Foreign Application Priority Data

Feb. 22, 2013 (KR) .................. 10-2013-0018961
Nov. 12, 2013 (KR) .................. 10-2013-0137168

(51) Int. Cl.
*G06F 3/041* (2006.01)
*G06F 3/044* (2006.01)

(52) U.S. Cl.
CPC ............ *G06F 3/041* (2013.01); *G06F 3/044* (2013.01); *G06F 3/0416* (2013.01); *G06F 2203/04101* (2013.01); *G06F 2203/04106* (2013.01)

(58) Field of Classification Search
CPC . G06F 2203/04106; G06F 2203/04101; G06F 3/0416; G06F 3/0488; G06F 3/04845
See application file for complete search history.

(56) References Cited

U.S. PATENT DOCUMENTS

2006/0279548 A1* 12/2006 Geaghan .............. G06F 3/0416
345/173
2008/0094370 A1* 4/2008 Ording ................ G06F 3/04883
345/173
2009/0247233 A1* 10/2009 Kim ....................... G06F 3/041
455/566

(Continued)

FOREIGN PATENT DOCUMENTS

CN          101194221 A       6/2008
CN          102455823 A       5/2012

(Continued)

OTHER PUBLICATIONS

Chinese Office Action dated Aug. 2, 2017 in corresponding Chinese Patent Application No. 201410056423.5 (13 pages in English and 8 pages in Chinese).

(Continued)

*Primary Examiner* — Nitin Patel
*Assistant Examiner* — Amen Bogale
(74) *Attorney, Agent, or Firm* — NSIP Law

(57) ABSTRACT

An apparatus for recognizing a proximity motion using sensors may include a first sensor to sense a first input region, a second sensor to sense a second input region distinct from the first input region, and an information transfer controller to transfer information related to a transition, between the first sensor and the second sensor.

41 Claims, 17 Drawing Sheets

(56) References Cited

U.S. PATENT DOCUMENTS

| | | | |
|---|---|---|---|
| 2009/0309851 A1* | 12/2009 | Bernstein | G06F 3/0416 345/174 |
| 2011/0050575 A1* | 3/2011 | Krahenbuhl | G06F 3/0236 345/168 |
| 2011/0279364 A1* | 11/2011 | Koshiyama | G06F 3/0412 345/156 |
| 2012/0050180 A1* | 3/2012 | King | G06F 3/0416 345/173 |
| 2012/0069055 A1* | 3/2012 | Otsuki | G06F 3/017 345/681 |
| 2012/0133587 A1* | 5/2012 | Edwards | G06F 3/021 345/168 |
| 2012/0162636 A1* | 6/2012 | Sy | G01S 17/026 356/51 |
| 2013/0141435 A1* | 6/2013 | Cho | G06T 15/50 345/426 |
| 2013/0222226 A1* | 8/2013 | Terlouw | G06F 3/041 345/156 |
| 2013/0314365 A1* | 11/2013 | Woolley | G06F 3/044 345/174 |

FOREIGN PATENT DOCUMENTS

| | | |
|---|---|---|
| CN | 102541379 A | 7/2012 |
| EP | 2 124 138 A2 | 11/2009 |
| JP | 2011-22958 A | 2/2011 |
| JP | 2011-210083 | 10/2011 |
| JP | 2011-257820 A | 12/2011 |
| JP | 2012-48325 | 3/2012 |
| JP | 2012-114920 A | 6/2012 |
| JP | 2012-181596 A | 9/2012 |
| JP | 2012-226691 A | 11/2012 |
| JP | 2013-16018 A | 1/2013 |
| KR | 10-2007-0006477 | 1/2007 |
| KR | 10-2012-0058996 | 6/2012 |
| KR | 10-2012-0085783 | 8/2012 |

OTHER PUBLICATIONS

Japanese Office Action dated Dec. 19, 2017 in corresponding Japanese Application No. 2014-021352 (5 Pages in Japanese, 5 pages in English).

* cited by examiner

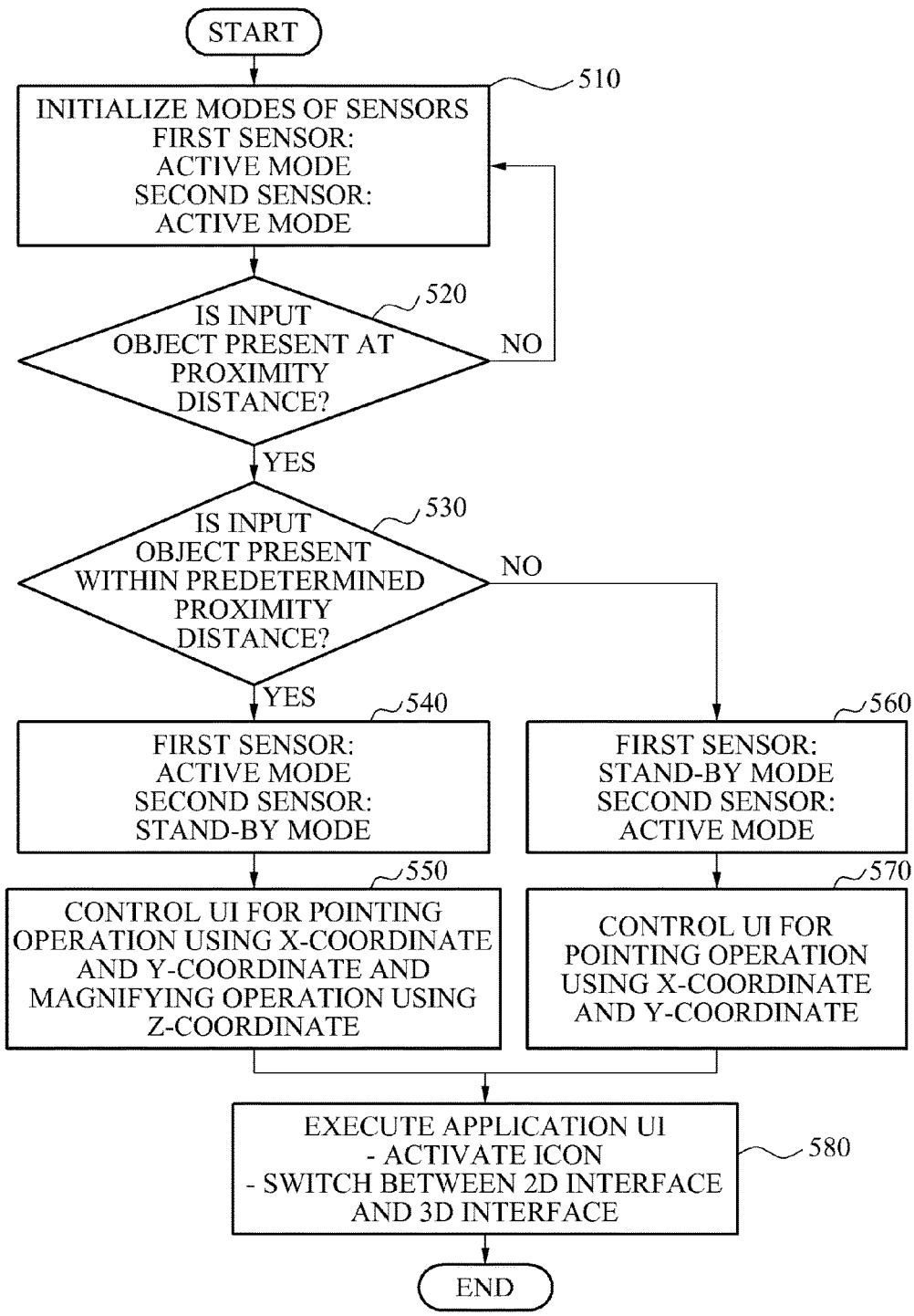

APPARATUS AND METHOD FOR RECOGNIZING PROXIMITY MOTION USING SENSORS

CROSS-REFERENCE TO RELATED APPLICATIONS

This application claims the priority benefit of Korean Patent Application No. 10-2013-0018961, filed on Feb. 22, 2013 and Korean Patent Application No. 10-2013-0137168, filed on Nov. 12, 2013 in the Korean Intellectual Property Office, the disclosure of which are incorporated herein by reference.

BACKGROUND

1. Field

The following description relates to an apparatus and method for recognizing a proximity motion using sensors.

2. Description of the Related Art

A touch input scheme performed on a two-dimensional (2D) plane is used in various portable devices, such as a smart phone, a tablet computer, and a laptop computer, for example. In particular, the touch input scheme has been developed from a single point recognition technique of receiving a single touch input to a multipoint recognition technique of receiving a plurality of touch inputs simultaneously.

Relative to a user input provided by touch screen technology, proximity motion recognition technology may reduce fingerprint smudges on the input display screen, and provide a three-dimensional interface for user input. However, proximity motion recognition may also reduce an accuracy of the user input.

SUMMARY

Accordingly, a proximity motion apparatus may use a first sensor with a near range and a second sensor with a far range to detect a user input for an input display screen, and manage power supplied to each sensor. A user interface for the input display screen may be adapted to correspond to a detected motion in the near range, such that a user may more accurately provide the user input. For example, the user interface may be magnified as a motion is detected approaching the input display screen. The user interface may switch from a two dimensional interface to a three dimensional interface, or vice versa, as the approaching motion is detected. Icons may be adapted to shift position on the input display screen to prevent the icons from being obscured by the approaching motion. Such adaptations of the input display screen may be intuitive to a user, and mimic a natural movement of the user.

The foregoing and/or other aspects are achieved by providing an apparatus for recognizing a proximity motion using sensors, the apparatus including a first sensor to sense a first input space at a distance closer than a predetermined distance from a reference surface for recognizing a proximate motion, a second sensor to sense a second input space at a distance farther than the predetermined distance from the reference surface, and an information transfer controller to transfer information related to a transition of an input object, between the first sensor and the second sensor, when the transition occurs between the first input space and the second input space.

The apparatus may further include a proximity measurer to measure a proximity between the input object and the reference surface, and a sensor controller to selectively activate the first sensor and the second sensor, based on the measured proximity.

The apparatus may further include a display to display a proximity motion interface, and an interface controller to control the proximity motion interface for a size of an area being indicated by a first input object to be changed based on a proximity between the first input object and the reference surface, when the first input object is input in the first input space.

The apparatus may further include an interface controller to control the proximity motion interface for at least one predetermined icon to be disposed along a perimeter of a point being indicated by a second input object, when the second input object is input in the second input space, and a signal processor to extract an axis and an endpoint of the first input object based on an output signal of the first sensor, when the first input object is input in the first input space. Here, the interface controller may control, using the axis and the endpoint of the first input object, the proximity motion interface for the at least one predetermined icon to be disposed along a perimeter of an area in which the display is obscured by the first input object, when the first input object is input in the first input space.

The apparatus may further include a plurality of input sensing units to determine whether a plurality of input objects is sensed, based on at least one of an output signal of the first sensor and an output signal of the second sensor, and an input selector to select at least one of the plurality of input objects based on a predetermined mode, when the plurality of input sensing units determines that the plurality of input objects is sensed.

The apparatus may further include an input pattern recognizer to recognize an input pattern based on at least one of an output signal of the first sensor and an output signal of the second sensor, and a function performer to perform a function corresponding to the input pattern.

The apparatus may further include a display to provide a two-dimensional (2D) interface and a three-dimensional (3D) interface, a calculator to calculate at least one of a position, a velocity, and an angular velocity of the input object, based on at least one of an output signal of the first sensor and an output signal of the second sensor, and a display controller to control an operation mode of the display based on a result of the calculating.

The foregoing and/or other aspects are achieved by providing a method of recognizing a proximity motion using sensors, the method including sensing, using a first sensor, a first input space when an input object is present in the first input space at a distance closer than a predetermined distance from a reference surface for recognizing a proximity motion, sensing, using a second sensor, a second input space when the input object is present in the second input space at a distance farther than the predetermined distance from the reference surface, and transferring information related to a transition of the input object, between the first sensor and the second sensor when the transition occurs between the first input space and the second input space.

The foregoing and/or other aspects are achieved by providing a method of controlling a user interface, the method including sensing an input in a first region near the user interface; sensing the input in a second region outside the first region; and selectively controlling the user interface in a first manner and a second manner based on at least one of a position and movement of the sensed input within the first region and the second region.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which:

FIG. 5 illustrates an operation of an apparatus for recognizing a proximity motion according to example embodiments;

DETAILED DESCRIPTION

Figure 1:
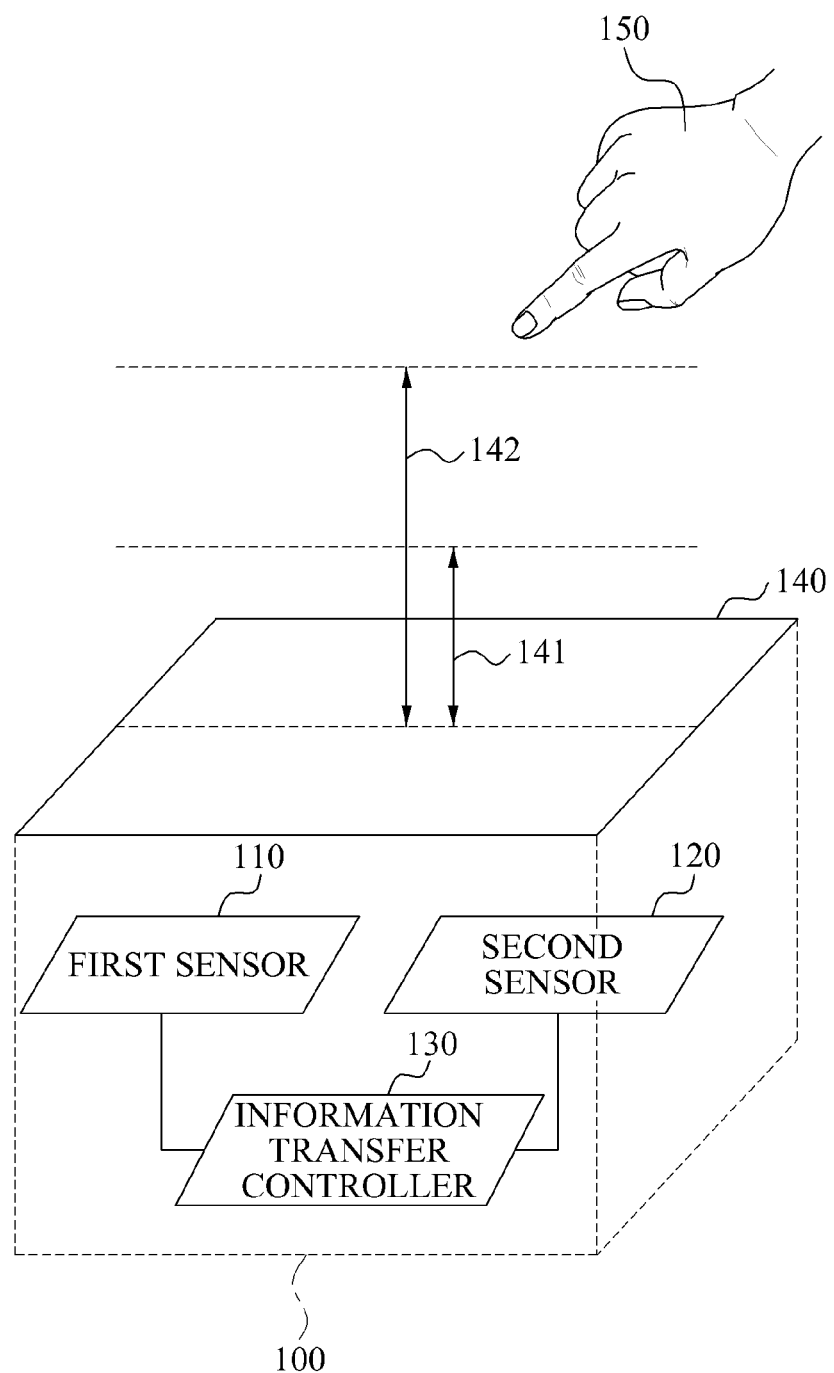
FIG. 1 illustrates an apparatus for recognizing a proximity motion using sensors according to example embodiments.

Reference will now be made in detail to embodiments, examples of which are illustrated in the accompanying drawings, wherein like reference numerals refer to like elements throughout. Embodiments are described below to explain the present disclosure by referring to the figures.

Hereinafter, an apparatus for recognizing a proximity motion may be referred to simply as the apparatus.

FIG. 1 illustrates an apparatus 100 for recognizing a proximity motion using sensors according to example embodiments.

Referring to FIG. 1, the apparatus 100 may include a first sensor 110, a second sensor 120, and an information transfer controller 130.

Here, technology for recognizing a proximity motion may refer to technology for developing a touch input scheme from a two-dimensional (2D) scheme to a three-dimensional (3D) scheme. The apparatus 100 may refer to an apparatus that may receive an input of a proximity motion from a user and recognize the input proximity motion, and may be implemented in various forms, such as a fixed device and a portable device, for example. The first sensor may be a first type of sensor and the second sensor may be a second type of sensor. However, the disclosure is not limited thereto. For example, the sensors may be of the same type, but configured to sense an input in different distance ranges.

The first sensor 110 may sense a first input space, or region, at a distance closer than a first predetermined distance 141 from a reference surface 140 for recognizing a proximity motion.

Although not shown in the drawings, the apparatus 100 may further include a display, and the reference surface 140 may be disposed above the display.

In this instance, the first sensor 110 may be implemented by various schemes. For example, the first sensor 110 may be implemented using an infrared sensor or an ultrasonic sensor installed at an edge of the display, or may be implemented using an image sensor, a depth sensor, or a touch sensor panel.

In addition, the second sensor 120 may sense a second input space at a distance farther than the first predetermined distance 141 and closer than a second predetermined distance 142 from the reference surface 140. Here, a value of the second predetermined distance 142 may be greater than a value of the first predetermined distance 141.

When an input object 150 is input at a position corresponding to the first predetermined distance 141, the apparatus 100 may sense the input object 150 using the first sensor 110 or the second sensor 120, based on predetermined settings.

In this instance, the second sensor 120 may be implemented by various schemes. For example, the second sensor 120 may be implemented using an infrared sensor or an ultrasonic sensor installed at an edge of the display, or may be implemented using an image sensor, a depth sensor, or a touch sensor panel.

Here, the first predetermined distance 141 and the second predetermined distance 142 may be predetermined based on a characteristic of the first sensor 110 and a characteristic of the second sensor 120, respectively.

The apparatus 100 may process an input being sensed in a space most proximate to the reference surface 140 and an input being sensed in a space relatively far from the reference surface 140 in different manners, using at least two different sensors.

Accordingly, the apparatus 100 may provide technology that may combine advantages of different sensors, for example, an advantage of an image sensor sensing a relatively wide input space, and an advantage of a touch sensor panel sensing an input object rapidly and accurately.

In addition, the apparatus 100 may provide technology for avoiding handprints generated by inputs being left behind, when compared to a touch screen input scheme. Also, the apparatus 100 may provide technology for reducing an input load of providing an input for a screen to be touched directly, and technology for receiving various inputs, for example, intuitive and natural gesture inputs, such as a motion of turning a page, a motion of picking up an object, and the like, by utilizing a 3D space.

Hereinafter, for ease of description, the first sensor 110 may correspond to a capacitive touch sensor configured to sense a space at a distance within 5 centimeters (cm) from the reference surface 140, and the second sensor 120 may correspond to a vision sensor configured to sense a space at a distance greater than or equal to 5 cm from the reference surface 140. However, the scope of the present disclosure is not to be limited thereto.

Here, the vision sensor may recognize spatial information of a target object, by sensing a change in light with respect to the target object over time, for example, a time-derivative value of light. When the target object is moved, the vision sensor may selectively sense the movement, by distinguishing the movement from a background. For example, the vision sensor may include a dynamic vision sensor (DVS) configured to sense only a change in an intensity of light in each pixel.

In addition, when a transition of the input object 150 occurs between the first input space and the second input space, the information transfer controller 130 may transfer information related to the transition, between the first sensor 110 and the second sensor 120.

For example, when the input object 150 slowly approaches from a position far from the reference surface 140, a transition of the input object 150 may occur from the second input space to the first input space.

In this instance, when the input object 150 is input in the second input space, the apparatus 100 may sense the input object 150 using the second sensor 120. Conversely, when the input object 150 is input in the first input space, the apparatus 100 may sense the input object 150 using the first sensor 110. Accordingly, when the transition of the input object 150 occurs from the second input space to the first input space, the apparatus 100 may switch a sensor to be used from the second sensor 120 to the first sensor 110.

Here, the information transfer controller 130 may transfer information related to the transition to the first sensor 110 or controller for controlling sensors. Here, the information related to the transition may be generated based on an output signal of the second sensor 120. The first sensor 110 may sense the input object 150 input in the first input space, based on the received information related to the transition.

Accordingly, the apparatus 100 may provide technology for seamless switching between the sensors. For example, the information related to the transition may include information related to a position of the input object 150 sensed by the second sensor 120. The first sensor 110 may use the position of the input object 150 included in the information related to the transition, as an initial input position. In so doing, the apparatus 100 may sense the input object 150 continuously and seamlessly although a sensor to be used for sensing the input object 150 is changed.

Identical descriptions provided above may be applied to a case of a transition of the input object 150 from the first input space to the second input space, and thus will be omitted for conciseness and ease of description.

Figure 2:
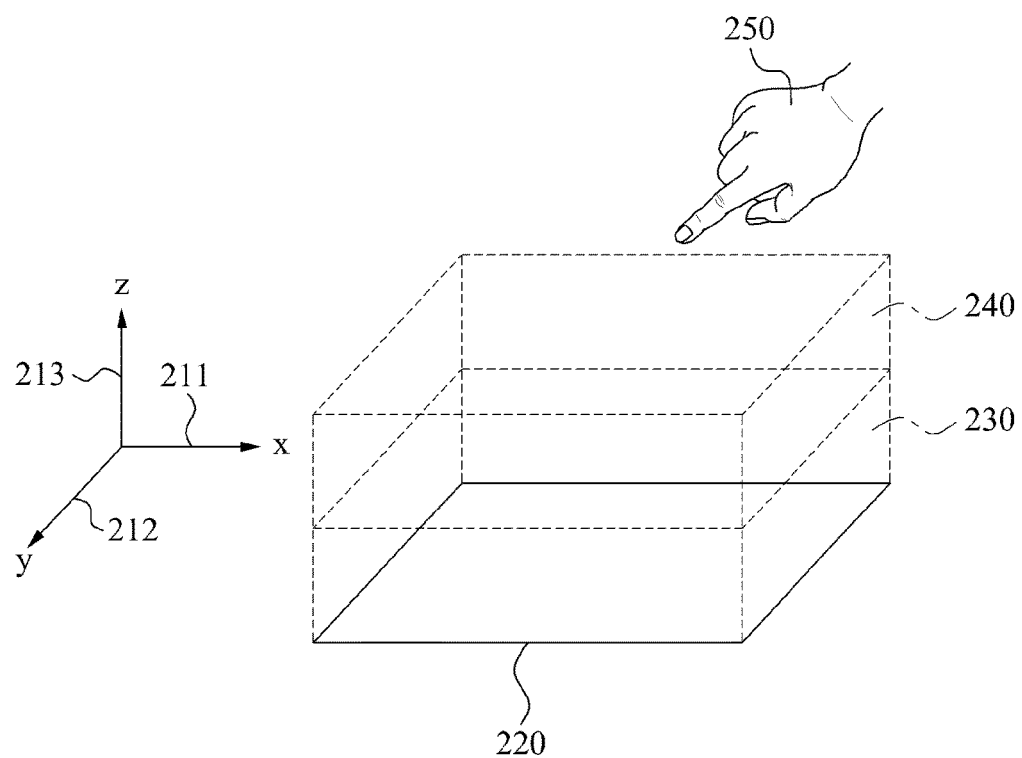
FIG. 2 illustrates an output signal of a first sensor and an output signal of a second sensor according to example embodiments.

FIG. 2 illustrates an output signal of a first sensor and an output signal of a second sensor according to example embodiments.

Referring to FIG. 2, the first sensor may output an x-coordinate, a y-coordinate, and a z-coordinate of an input object 250 being sensed in a first input space 230. The second sensor may output an x-coordinate, and a y-coordinate of the input object 250 being sensed in a second input space 240.

Here, the x-coordinate, the y-coordinate, and the z-coordinate may indicate positions at which the input object 250 is being sensed in an x-axial direction 211, a y-axial direction 212, and a z-axial direction 213, respectively, based on the origin present on a reference surface 220. For example, the origin may correspond to a point at an upper left edge of the reference surface 220.

An apparatus for recognizing a proximity motion according to the present embodiments may process an input being sensed in the first input space 230 closest to the reference surface 220, using 3D coordinates, and process an input being sensed in the second input space 240 relatively far from the reference surface 220, using 2D coordinates.

In this instance, information related to a transition of the input object 250 to be transferred by an information transfer controller when the transition occurs between the first input space 230 and the second input space 240 may include an x-coordinate and a y-coordinate of the input object 250 being sensed in a corresponding input space.

The first sensor or the second sensor may receive the transferred x-coordinate and y-coordinate as an initial position of the input object 250, thereby enabling seamless switching between sensors.

Figure 3:
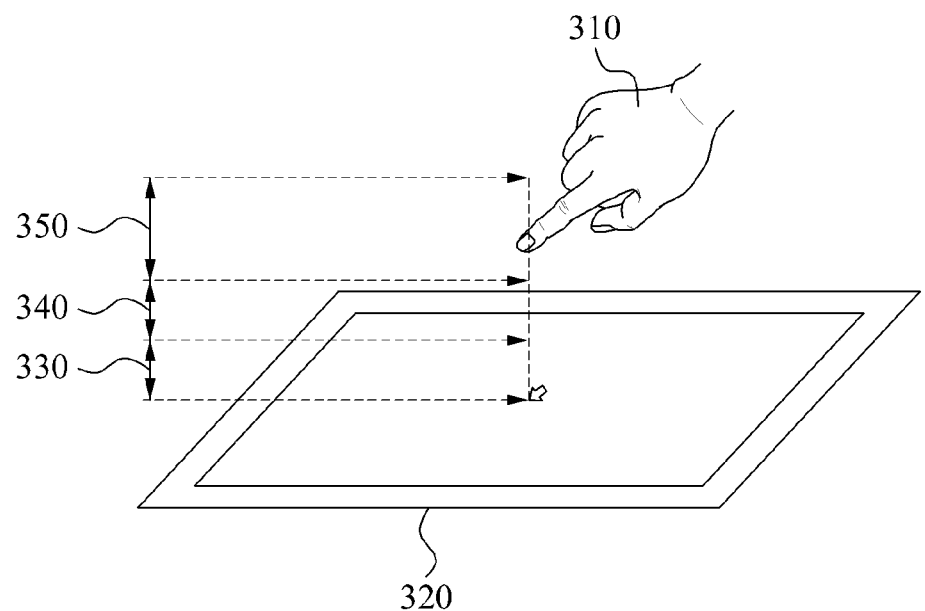
FIG. 3 illustrates a power saving mode of an apparatus for recognizing a proximity motion according to example embodiments.

FIG. 3 illustrates a power saving mode of an apparatus for recognizing a proximity motion according to example embodiments.

Referring to FIG. 3, the apparatus may selectively activate a first sensor and a second sensor based on a proximity between an input object 310 and a reference surface 320.

Although not shown in the drawings, the apparatus may further include a proximity measurer, and a sensor controller.

The proximity measurer may measure the proximity between the input object 310 and the reference surface 320. Here, the proximity refers to a measure indicating an extent of closeness between the input object 310 and the reference surface 320, and may include, for example, a shortest distance between the input object 310 and the reference surface 320, and the like.

In this instance, the proximity measurer may be implemented using a third sensor distinct from the first sensor and the second sensor. For example, the proximity measurer may be implemented using an infrared (IR) sensor, or may be of the same type as the first sensor or the second sensor. According to example embodiments, the proximity measurer may be implemented using an output signal of the first sensor and an output signal of the second sensor.

The sensor controller may selectively activate the first sensor and the second sensor, based on the measured proximity.

For example, when the input object 310 is sensed in a first input space 330, the sensor controller may activate the first sensor and deactivate the second sensor. In addition, the sensor controller may activate the second sensor and deactivate the first sensor, when the input object 310 is sensed in a second input space 350.

Accordingly, the apparatus may deactivate a sensor currently not in use, among sensors, thereby providing technology for reducing power consumption.

In addition, when the input object 310 is sensed in a transition space 340 between the first input space 330 and the second input space 350, the sensor controller may operate the second sensor in a stand-by mode while the first sensor is activated.

According to example embodiments, when the input object 310 is sensed in the transition space 340, the sensor controller may operate the first sensor in a stand-by mode while the second sensor is activated.

Here, the stand-by mode refers to an operation mode distinct from an inactive mode, and may include, for example, a low-power operation mode in which a sensor may require a shorter time for being activated, and the like.

Accordingly, the apparatus may provide technology for reducing power consumption and technology for increasing a sensing response rate, simultaneously.

Figure 4:
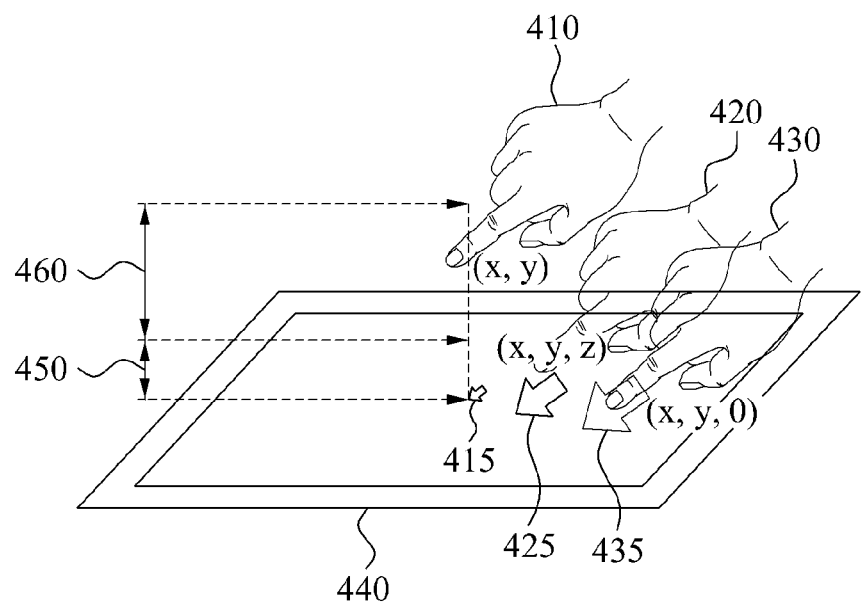
FIG. 4 illustrates a proximity motion interface provided by an apparatus for recognizing a proximity motion according to example embodiments.

FIG. 4 illustrates a proximity motion interface provided by an apparatus for recognizing a proximity motion according to example embodiments.

Referring to FIG. 4, the apparatus may further include a display configured to provide a proximity motion interface. Here, a reference surface 440 may be disposed above the display.

In particular, the apparatus may control the proximity motion interface for a size of an area being indicated by an input object to be changed, based on a proximity of the input object to the reference surface 440.

For example, when an input object 410 is input in a second input space 460, the apparatus may obtain an x-coordinate and a y-coordinate of the input object 410, using a second sensor. The apparatus may display an area 415 being indicated by the input object 410 in a predetermined size, using the obtained x-coordinate and y-coordinate.

In addition, when an input object 420 is input in a first input space 450, the apparatus may obtain an x-coordinate, a y-coordinate, and a z-coordinate of the input object 420 using a first sensor. In this instance, the apparatus may change a size of an area 425 being indicated by the input object 420, using the obtained x-coordinate and y-coordinate.

In this instance, the apparatus may control the size of the area 425 to be changed based on the obtained z-coordinate. For example, the apparatus may extract a proximity between the input object 420 and the reference surface 440 based on the obtained z-coordinate, and control the proximity motion interface for the size of the area 425 to increase as the proximity between the input object 420 and the reference surface 440 increases.

Accordingly, the apparatus may expand an area being indicated by an input object as a distance between the input object and a reference surface decreases, thereby providing technology for receiving an input of a more subtle pointing motion.

In addition, the apparatus may determine whether an input object 430 is in contact with the reference surface 440. In this instance, the input object 430 may be input in the first input space 450, and the apparatus may obtain an x-coordinate, a y-coordinate, and a z-coordinate of the input object 430, using the first sensor. The apparatus may determine whether the input object 430 is in contact with the reference surface 440, based on the z-coordinate of the input object 430.

When it is determined that the input object 430 is in contact with the reference surface 440, the apparatus may control the proximity motion interface for an area 435 being indicated by the input object 430 to be selected.

In this instance, the proximity motion interface may include at least one icon. The apparatus may control the proximity motion interface for a size of an icon being indicated by an input object to increase as a proximity between the input object and a reference surface increases. In addition, when the input object is in contact with the reference surface, the apparatus may control the proximity motion interface for an icon being indicated by the input object to be selected.

Further, the apparatus may perform a function corresponding to the selected icon. For example, in a case in which an icon being indicated by an input object corresponds to a call icon when the input object is in contact with a reference surface, the apparatus may perform a call function.

According to the present embodiments, the apparatus may provide user interface (UI) technology for facilitating an input motion in a space proximate to a reference surface.

According to example embodiments, the apparatus may further include a typical touch sensor configured to sense a touch input provided on the reference surface 440, in addition to the first sensor configured to sense the first input space and the second sensor configured to sense the second input space. In this instance, the apparatus may activate the touch sensor when it is determined that the input object 430 is in contact with the reference surface 440.

FIG. 5 illustrates an operation of an apparatus for recognizing a proximity motion according to example embodiments.

Referring to FIG. 5, in operation 510, the apparatus may initialize a first sensor and a second sensor. Here, the apparatus may initialize operation modes of the first sensor and the second sensor to be active modes, based on predetermined initialization settings.

In operation 520, the apparatus may determine whether an input object is present at a proximity distance. For example, the apparatus may determine whether the input object is sensed within a second distance at which an input object may be sensed by the second sensor.

When it is determined, in operation 520, that the input object is present at the proximity distance, the apparatus may determine whether the input object is present within a predetermined proximity distance, in operation 530. For example, when the input object is sensed within the second distance, the apparatus may determine whether the input object is sensed within a first distance at which the input object may be sensed by the first sensor.

In this example, the apparatus may maintain the active mode of the first sensor and switch the operation mode of the second sensor to a stand-by mode, in operation 540, when the input object is sensed within both the second distance and the first distance.

In this instance, the input object may be sensed in a first input space, and the apparatus may control an interface, for example, a UI, for performing a pointing operation using an x-coordinate and a y-coordinate of the sensed input object and a magnifying operation using a z-coordinate of the sensed input object, in operation 550.

Conversely, the apparatus may maintain the active mode of the second sensor, and switch the operation mode of the first sensor to a stand-by mode, in operation 560, when the input object is sensed within the second distance, whereas the input object is not sensed within the first distance.

In this instance, the input object may be sensed in a second input space, and the apparatus may control the interface for performing a pointing operation using an x-coordinate and a y-coordinate of the sensed input object.

Identical descriptions provided with reference to FIG. 4 may be applied to operations 550 and 570 and thus, a repeated description will be omitted for conciseness.

In addition, the apparatus may execute an application UI corresponding to the received input, in operation 580. For example, the apparatus may activate a selected icon, or may perform an operation of switching between a 2D interface and a 3D interface.

Figure 6A:
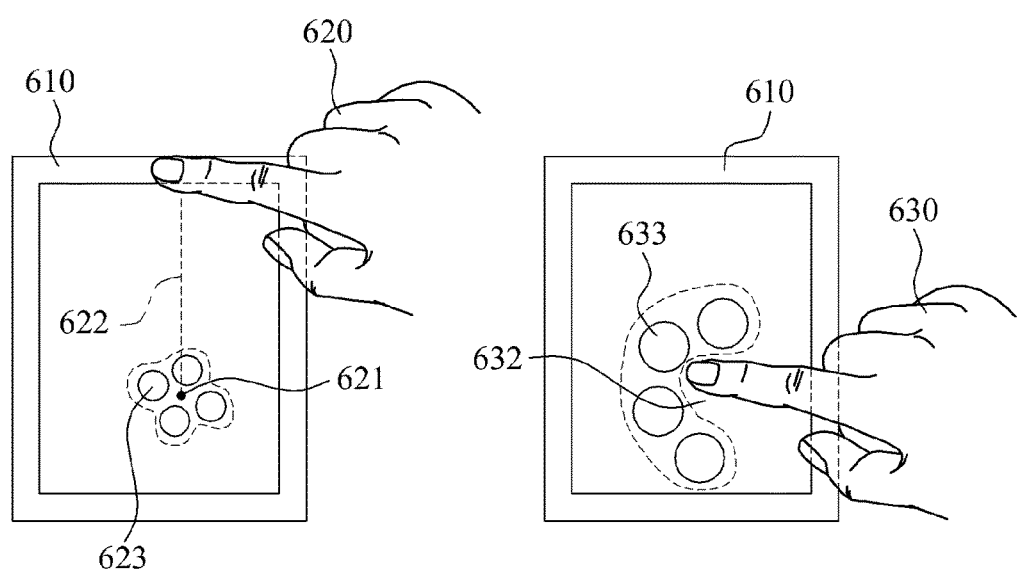
FIGS. 6A and 6B illustrate an operation of disposing an icon automatically, by an apparatus for recognizing a proximity motion according to example embodiments.
Figure 6B:
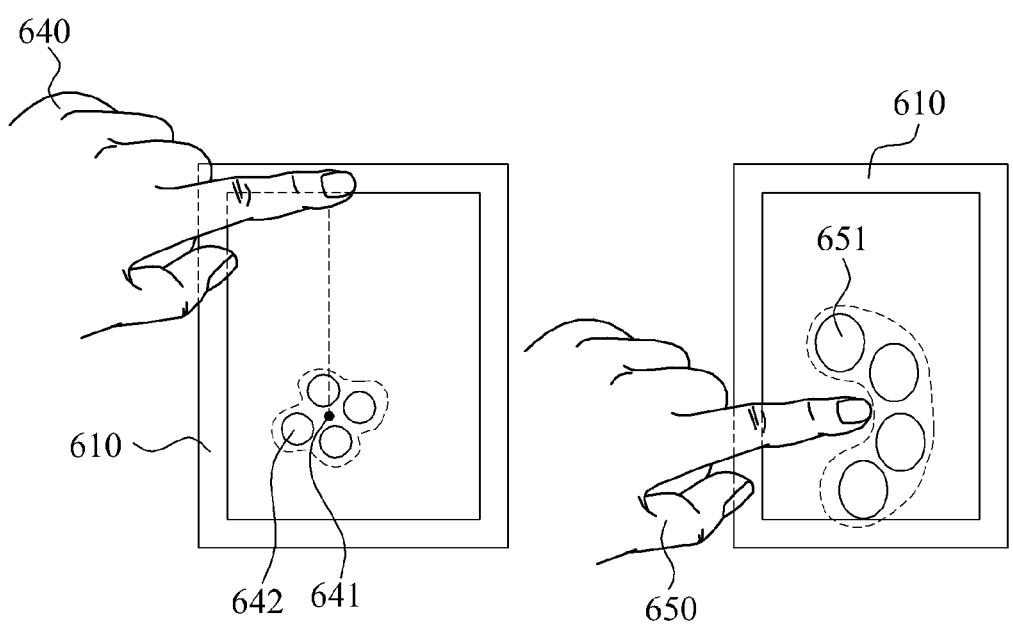

FIGS. 6A and 6B illustrate an operation of disposing an icon automatically by an apparatus for recognizing a proximity motion according to example embodiments.

Referring to FIG. 6A, the apparatus may control a proximity motion interface for at least one predetermined icon to be disposed along a perimeter of a point being indicated by an input object.

In particular, when an input object 620 is input in a second input space, the apparatus may obtain a point 621 being indicated by the input object 620, based on an output signal of a second sensor. Here, the second input space may be at a distance greater than or equal to a predetermined distance 622 from a reference surface 610. In this instance, the apparatus may provide an interface in which a plurality of icons 623 is disposed along a perimeter of the point 621 being indicated by the input object 620.

Figure 7:
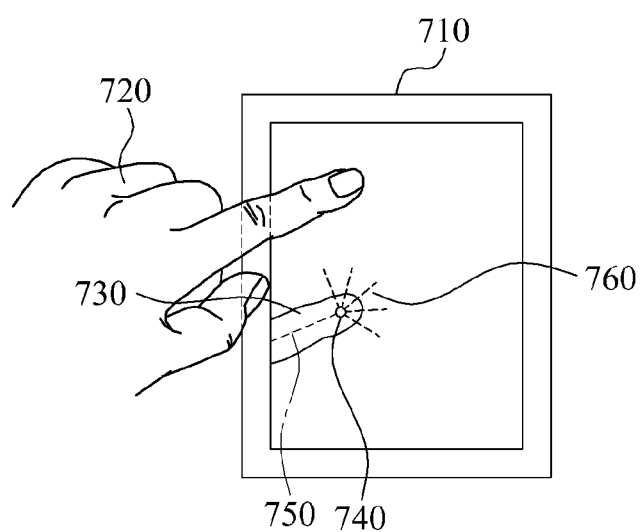
FIGS. 7, 8A, and 8B illustrate a signal processing method for an operation of disposing an icon automatically, by an apparatus for recognizing a proximity motion according to example embodiments.

In addition, when an input object 630 is input in a first input space, the apparatus may extract an axis and an endpoint of the input object 630, based on an output signal of a first sensor. For example, referring to FIG. 7, the apparatus may extract an axis 750 and an endpoint 740 from an image 730 of a sensed input object 720. Here, the axis 750 and the endpoint 740 may be disposed on a reference surface 710.

In this instance, the apparatus may provide an interface in which a plurality of icons 633 is disposed along a perimeter of an area in which a display is obscured by the input object 630. For example, referring to FIG. 7, the apparatus may control a proximity motion interface for a plurality of icons to be disposed in a form of a sector 760, starting from the endpoint 740 in a direction opposite to the axis 750.

Further, when the input object 630 is input in the first input space, the apparatus may control the proximity motion interface for a size of at least one predetermined icon to be changed based on a proximity 632 of the input object 630 and the reference surface 610. Identical descriptions provided with reference to FIG. 4 may be applied to the above operations and thus a repeated description will be omitted for conciseness.

Referring to FIG. 6B, the apparatus may be operated in an identical manner, when an input object having a mirror symmetry with the input object of FIG. 6A is input.

In particular, when an input object 640 is input in a second input space, the apparatus may obtain a point 641 being indicated by the input object 640, based on an output signal of a second sensor. In this instance, the apparatus may provide an interface in which a plurality of icons 642 is disposed along a perimeter of the point 641 being indicated by the input object 640.

In addition, when an input object 650 is input in a first input space, the apparatus may extract an axis and an endpoint of the input object 650, based on an output signal of a first sensor. In this instance, the apparatus may provide an interface in which a plurality of icons 651 is disposed along a perimeter of an area in which a display is obscured by the input object 650.

Accordingly, when an input object is disposed at a distance greater than or equal to a predetermined distance from a reference surface 610, the apparatus may dispose a plurality of icons along a perimeter of a point being indicated by the object, irrespective of an axial direction of the input object, because the display may not be obscured by the input object.

Conversely, when an input object is disposed proximate to the reference surface, the apparatus may dispose the plurality of icons along a perimeter of an area in which the display is obscured, in a line of sight of an axial direction of the input object, because a probability of the display being obscured by the input object may be high.

Figure 8A:
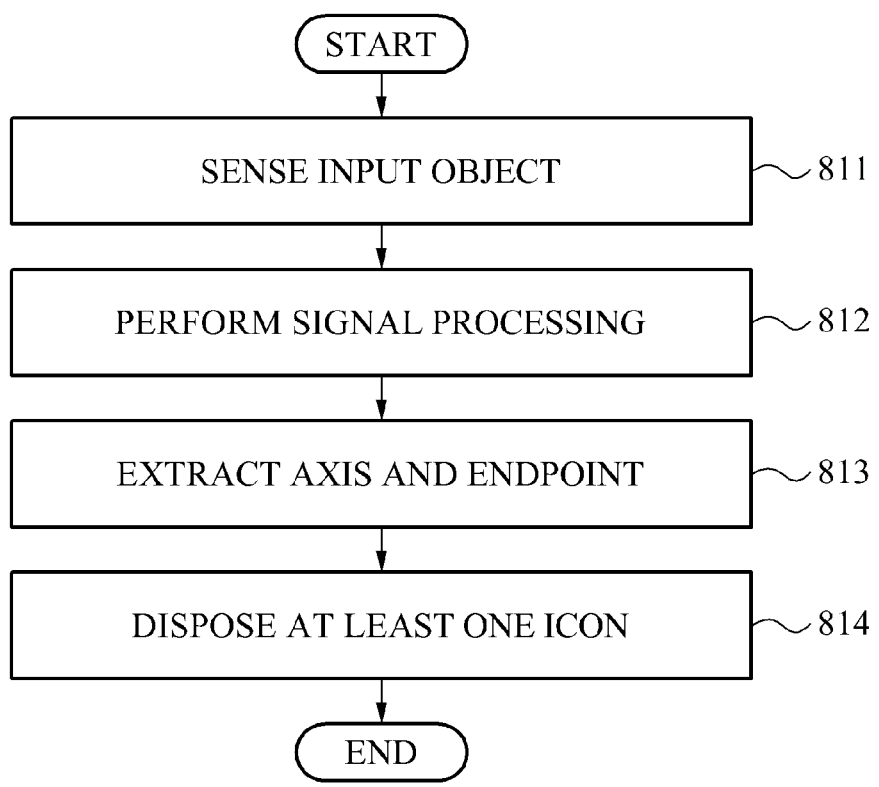
Figure 8B:
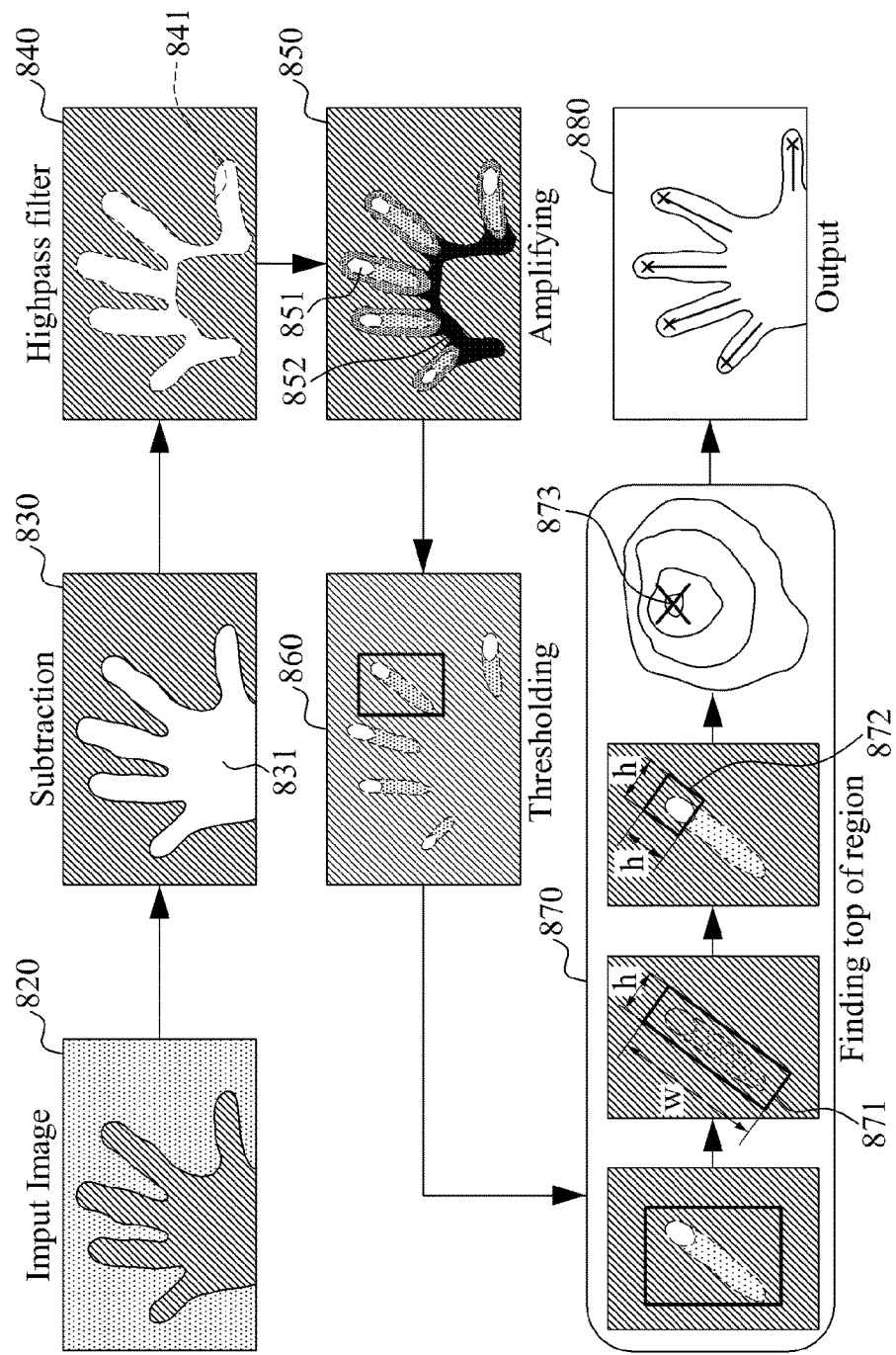

FIGS. 8A through 8B illustrate a signal processing method for an operation of disposing an icon automatically by an apparatus for recognizing a proximity motion according to example embodiments.

Referring to FIG. 8A, in operation 811, the apparatus may sense an input object. In operation 812, the apparatus may perform signal processing for extracting an axis and an endpoint of the sensed input object. In operation 813, the apparatus may extract the axis and the endpoint of the input object, based on a result of the signal processing. Operations 811 through 813 will be further described in detail with reference to FIG. 8B. In operation 814, the apparatus may dispose at least one predetermined icon, based on a proximity distance between the input object and a reference surface, the extracted axis, and the extracted endpoint.

Referring to FIG. 8B, the apparatus may perform image sensing of an input object in operation 820, a subtraction for removing a background excluding the input object in operation 830, high-pass filtering for indicating an outline of the input object in operation 840, an amplification for defining the outline in operation 850, thresholding for removing an outlier excluding the input object in operation 860, a search for a top of a region for searching for a point corresponding to a fingertip in operation 870, and an output of a result in operation 880, thereby extracting an axis and an endpoint of the input object.

In particular, the apparatus may acquire an input image through the image sensing performed in operation 820. For example, the apparatus may acquire a depth image of the input object as the input image. The apparatus may extract an object 831 from the input image through the subtraction performed in operation 830. For example, the apparatus may distinguish between an object and a background in the depth image, and extract a portion corresponding to the object from the depth image. A method of distinguishing between an object and a background in a depth image may be implemented using various methods. For example, the apparatus may use a threshold depth that distinguishes between an object and a background. The apparatus may classify a pixel having a depth less than or equal to the threshold depth as an object, and classify a pixel having a depth greater than the threshold depth as a background.

The apparatus may obtain an outline 841 of the input object through the high-pass filtering performed in operation 840. For example, the apparatus may extract pixels of which depths are different from neighboring pixels by at least a predetermined amount. The outline 841 extracted by the high-pass filtering may include outlines of the thumb and the four fingers. The apparatus may define the outline 841 of the input object through the amplification performed in operation 850. For example, the apparatus may amplify values of pixels included inside the outline 841 of the input object. When the input image corresponds to a depth image, depths of pixels in the depth image may be amplified. Hereinafter, a depth of a pixel expressed using a relatively bright color may be less than a depth of a pixel expressed using a relatively dark color. For example, a depth of a pixel included in an area 851 expressed using a relatively bright color may be less than a depth of a pixel included in an area 852 expressed using a relatively dark color.

The apparatus may remove an outlier excluding the input object, through the thresholding performed in operation 860. For example, the apparatus may remove pixels having depths greater than the threshold depth from among pixels of the provided depth image. The apparatus may identify a point corresponding to a fingertip through the search for the top of the region performed in operation 870. The apparatus may generate a rectangular model 871 surrounding a finger, with respect to each of the thumb and the four fingers. The rectangular model 871 may have a height h and a width w.

The apparatus may search for a pixel having a least a top point, for example, a least a depth, in a single end area of the rectangular model 871. The apparatus may search for a pixel 873 having a least depth in a rectangular area 872 located at a single end of the rectangular model 871 and of which four sides are of a length h. The found pixel 873 may correspond to an endpoint of the input object. In addition, a line segment which extends in a direction of the width of the rectangular model 871 based on the endpoint may correspond to an axis of the input object. The apparatus may output at least one pair of the endpoint and the axis of the input object, through the result output performed in operation 880. For example, the apparatus may output a pair of an endpoint and an axis, with respect to each of the thumb and the four fingers.

Figure 9A:
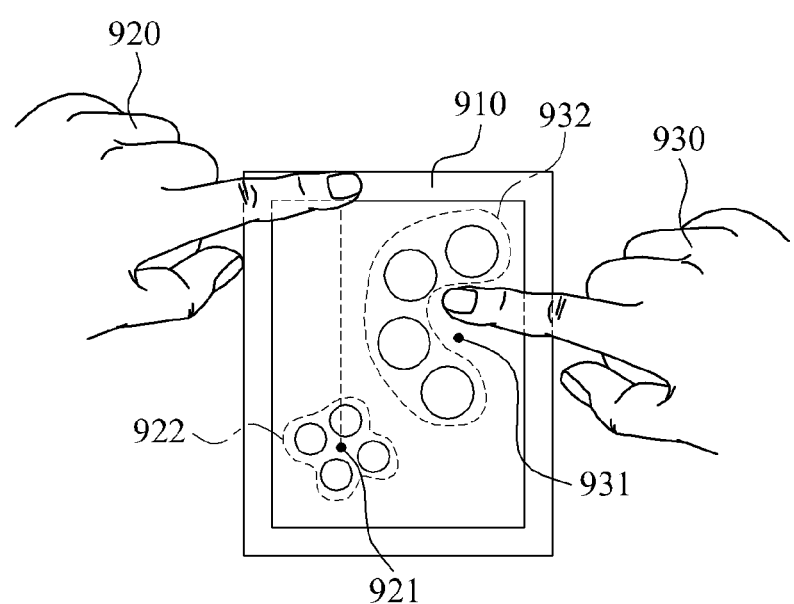
FIGS. 9A, 9B, 9C, and 10 illustrate an operation of an apparatus for recognizing a proximity motion when a plurality of input objects is sensed according to example embodiments.
Figure 9B:
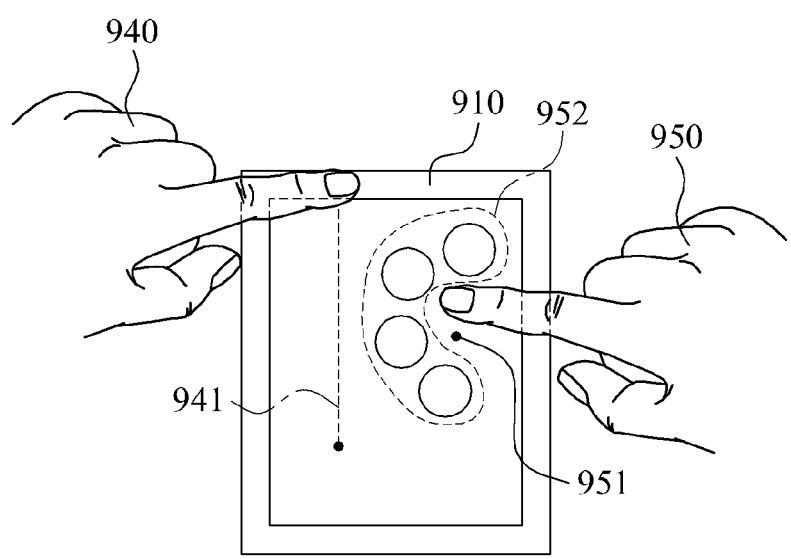
Figure 9C:
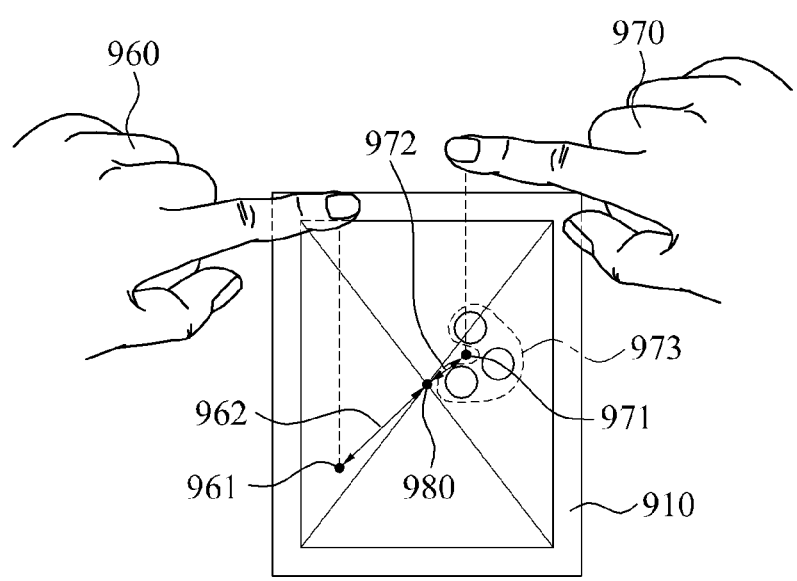
Figure 10:
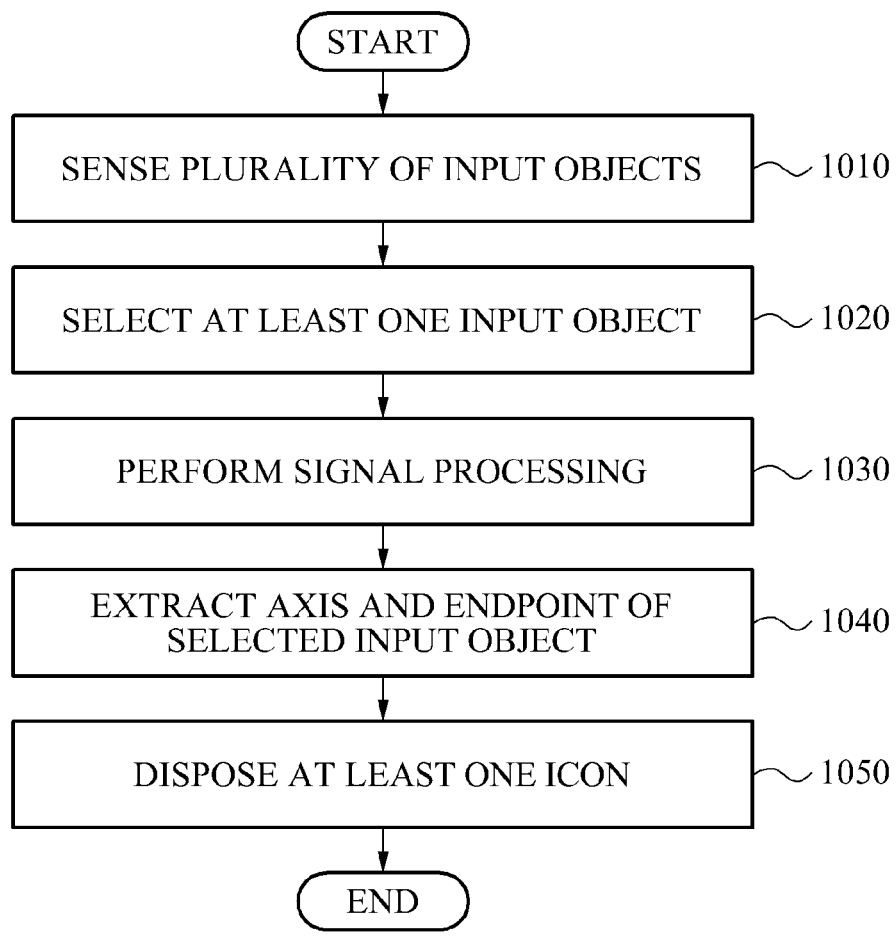

FIGS. 9A through 10 illustrate an operation of an apparatus for recognizing a proximity motion when a plurality of input objects is sensed according to example embodiments.

Although not shown in the drawings, the apparatus may further include a plurality of input sensing units, and an input selector.

The plurality of sensing units may determine whether a plurality of input objects is sensed, based on at least one of an output signal of a first sensor and an output signal of a second sensor.

In addition, the input selector may select at least one of the plurality of input objects, based on a predetermined mode, when the plurality of input sensing units determines that the plurality of input objects is sensed.

For example, referring to FIG. 9A, the apparatus may be operated in a mode in which a plurality of inputs is received. In this instance, the apparatus may process a plurality of inputs provided by a first input object 920 and a second input object 930.

In particular, the apparatus may dispose first icons 922 along a perimeter of a point 921 being indicated by the first input object 920 at a distance greater than or equal to a predetermined distance from a reference surface 910. Simultaneously, the apparatus may dispose second icons 932 along a perimeter of an area obscured by the second input object 930, rather than a point 931 being indicated by the second input object 930 proximate to the reference surface 910.

Referring to FIG. 9B, according to example embodiments, the apparatus may be operated in a mode in which an input object most proximate to the reference surface is selected. In this instance, the apparatus may not dispose icons along a perimeter of a point 941 being indicated by a first input object 940 at a distance relatively farther from the reference surface 910. The apparatus may select a second input object 950 most proximate to the reference surface 910, and dispose predetermined icons 952 along a perimeter of an area obscured by the second input object 950.

Depending on a case, the second input object 950 most proximate to the reference surface 910 may be at a distance greater than or equal to a predetermined distance from the reference surface 910. In this instance, the apparatus may dispose the predetermined icons 952 along a perimeter of a point 951 being indicated by the second input object 950.

Referring to FIG. 9C, according to example embodiments, the apparatus may be operated in a mode in which an input object is selected when a position being indicated by the input object is most proximate to a predetermined position above the reference surface.

For example, the apparatus may select an input object indicating a position most proximate to a center 980 of the reference surface 910. A first input object 960 may indicate a position 961 at a distance 962 from the center 980 of the reference surface 910, and a second input object 970 may indicate a position 971 at a distance 972 from the center 980 of the reference surface 910. In this instance, the apparatus may select the second input object 970 indicating the position 971 more proximate to the center 980 of the reference surface 910.

The apparatus may dispose at least one predetermined icon 973, based on a proximity between the selected second input object 970 and the reference surface 910.

Referring to FIG. 10, in operation 1010, the apparatus may sense a plurality of input objects. In operation 1020, the apparatus may select at least one input object, based on a predetermined mode. In operation 1030, the apparatus may perform signal processing for extracting an axis and an endpoint of the selected input object. In operation 1040, the apparatus may extract the axis and the endpoint of the selected input object, based on a result of the signal processing. In operation 1050, the apparatus may dispose at least one predetermined icon, based on at least one of the extracted axis, the extracted endpoint, a distance between the selected input object and a reference surface, and a distance between the selected input object and a predetermined position on the reference surface, for example.

Identical descriptions provided with reference to FIGS. 1 through 9C may be applied to the modules of FIG. 10 and thus a repeated description will be omitted for conciseness.

Figure 11:
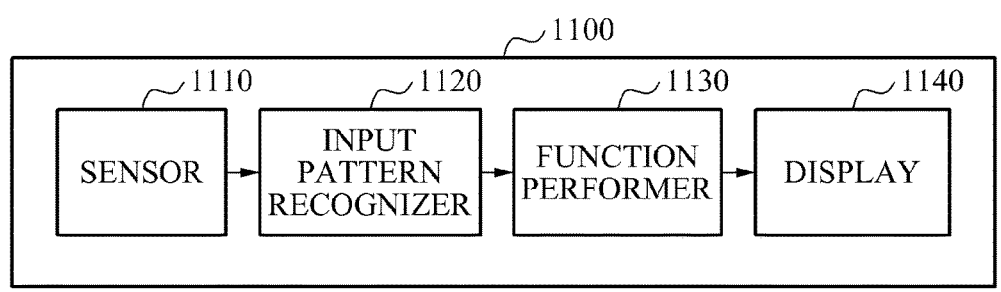
FIG. 11 illustrates an apparatus for recognizing a proximity motion that may recognize an input pattern according to example embodiments.

FIG. 11 illustrates an apparatus 1100 for recognizing a proximity motion that may recognize an input pattern according to example embodiments.

Referring to FIG. 11, the apparatus 1100 may include a sensor 1110, an input pattern recognizer 1120, a function performer 1130, and a display 1140.

The sensor 1110 may include a first sensor and a second sensor. The input pattern recognizer 1120 may recognize an input pattern, based on at least one of an output signal of the first sensor and an output signal of the second sensor.

Here, the input pattern recognizer 1120 may track a movement of an input object, thereby sensing a change in at least one of a number of proximity motion points, a direction of a proximity motion, and a change in proximity coordinates, for example.

The function performer 1130 may perform a function corresponding to the input pattern recognized by the input pattern recognizer 1120. Here, the function performer 1130 may determine a function corresponding to the input pattern differently, based on a type of an application currently being executed. For example, although identical input patterns are input, the apparatus may perform different functions, based on the type of the application currently being executed.

The input pattern recognizer 1120 may calculate at least one of a velocity and an angular velocity of the input object, based on at least one of the output signal of the first sensor and the output signal of the second sensor.

For example, the input pattern recognizer 1120 may track a change in a position of the input object, based on at least one of the output signal of the first sensor and the output signal of the second sensor. In this instance, the input pattern recognizer 1120 may calculate the velocity or the angular velocity of the input object, using a value of the change in the position of the input object.

In addition, the function performer 1130 may detect a function corresponding to the input pattern, based on the velocity or the angular velocity of the input object calculated by the input pattern recognizer 1120.

For example, the function performer 1130 may utilize the velocity or the angular velocity of the input object calculated by the input pattern recognizer 1120, as information required for various UIs, such as a speed at which cards are shuffled and a rotational speed of a roulette wheel, for example.

In addition, the apparatus 1100 may output a result of the performance of the function performer 1130 using the display 1140.

Figure 12A:
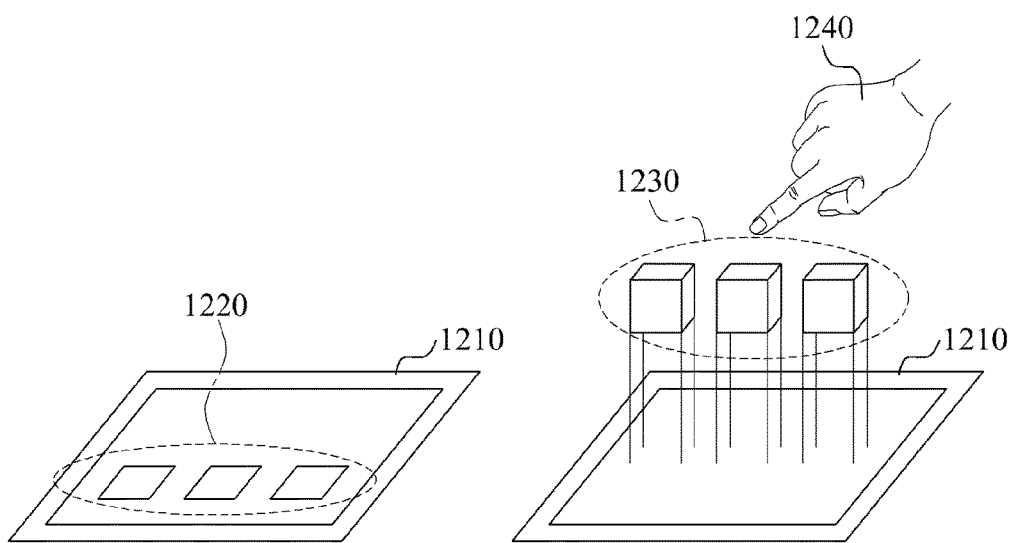
FIGS. 12A and 12B illustrate an operation of switching between a two-dimensional (2D) interface and a three-dimensional (3D) interface by an apparatus for recognizing a proximity motion according to example embodiments.
Figure 12B:
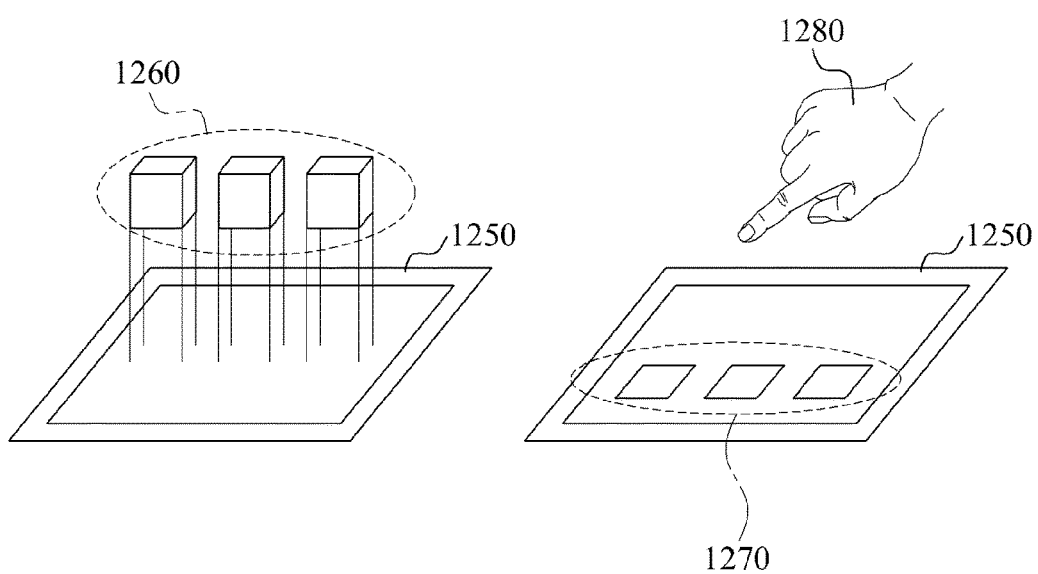

FIGS. 12A and 12B illustrate an operation of switching between a 2D interface and a 3D interface by an apparatus for recognizing a proximity motion according to example embodiments.

Although not shown in the drawings, the apparatus may further include a display, a calculator, and a display controller.

The display may provide a 2D interface and a 3D interface. The calculator may calculate at least one of a position, a velocity, and an angular velocity of an input object, based on an output signal of a first sensor and an output signal of a second sensor. The display controller may control an operation mode of the display, based on the calculation.

For example, referring to FIG. 12A, the apparatus may sense an input object input in a space at a predetermined distance from a reference surface 1210. When an input object sensed in the corresponding space is absent, the apparatus may display a plurality of icons 1220 using the 2D interface.

When an input object 1240 is sensed in the corresponding space, the apparatus may switch from the 2D interface to the 3D interface. In this instance, the apparatus may display a plurality of icons 1230 using the 3D interface.

Referring to FIG. 12B, according to example embodiments, when an input object sensed in a space at a predetermined distance from a reference surface 1250, the apparatus may display a plurality of icons 1260 using the 3D interface.

When an input object 1280 is sensed in the corresponding space, the apparatus may switch from the 3D interface to the 2D interface. In this instance, the apparatus may display a plurality of icons 1270 using the 2D interface.

The method according to the above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus for recognizing a proximity motion using sensors, the apparatus comprising:
   sensors, operatively connected and comprising:
      a first sensor configured to sense an off-surface first input region at a distance closer than a predetermined distance off of a reference surface for recognizing a proximate motion of a first input object within the off-surface first input region, and
      a second sensor simultaneously operable with the first sensor and configured to sense a second input region at a distance farther than the predetermined distance from the reference surface, wherein the second sensor senses a rate of change of light of each pixel over time; and
   an information transfer controller to transfer information between the first sensor and the second sensor, the information related to a transition of the first input object in response to the transition occurring between the first input region and the second input region.

2. The apparatus of claim 1, further comprising:
   a proximity measurer to measure a proximity between the first input object and the reference surface; and
   a sensor controller to selectively activate the first sensor and the second sensor, based on the measured proximity.

3. The apparatus of claim 2, wherein the sensor controller comprises:
   a proximity comparator to compare the proximity to the predetermined distance; and
   an operation mode controller to control an operation mode of the first sensor and an operation mode of the second sensor, based on the comparison,
   wherein the operation mode comprises at least one of an active mode, an inactive mode, and a stand-by mode.

4. The apparatus of claim 3, wherein the operation mode controller controls the second sensor to transition from the active mode to the stand-by mode or the inactive mode and controls the first sensor to transition from the inactive or the stand-by mode to the active mode when the first input object is determined to be transitioning into the first input region from the second input region based on the measured proximity.

5. The apparatus of claim 3, wherein the operation mode controller controls the first sensor to transition from the active mode to the standby mode or the inactive mode and controls the second sensor to transition from the inactive or the standby mode to the active mode when the first input object is determined to be transitioning into the second input region from the first input region based on the measured proximity.

6. The apparatus of claim 1, wherein the information related to the transition comprises an x-coordinate and a y-coordinate of the first input object being sensed in at least one of the first input region and the second input region.

7. The apparatus of claim 1, wherein:
   the first sensor senses and indicates a three-dimensional location, including sensed x, y, and z-coordinates, of the first input object in the first input region, and
   the second sensor senses and indicates a two-dimensional location, including sensed x and y-coordinates, of the first input object in the second input region.

8. The apparatus of claim 1, wherein:
the first sensor comprises a touch sensor to distinguish between a touching of the reference surface by the first input object and the object being sensed within the first input region, and
the second sensor comprises a vision sensor and indicates a two-dimensional location of the first input object based on a captured depth image.

9. The apparatus of claim 1, further comprising:
a display to display a proximity motion interface; and
an interface controller to control sizing of an area of the proximity motion interface indicating the first input object based on a proximity between the first input object and the reference surface, in response to the first input object being input in the first input region.

10. The apparatus of claim 9, wherein:
the proximity motion interface comprises at least one icon, and
the interface controller controls, in response to the at least one icon being an icon indicated by the first input object, each of sizing of the icon to increase as the proximity between the first input object and the reference surface increases, and selection of the icon, such that the icon is selected in response to the first input object being in contact with the reference surface.

11. The apparatus of claim 1, further comprising:
a display to display a proximity motion interface; and
an interface controller to control the proximity motion interface to dispose at least one predetermined icon along a perimeter of a point indicated by a second input object, in response to the second input object being input in the second input region.

12. The apparatus of claim 11, further comprising:
a signal processor to extract an axis and an endpoint of the first input object based on an output signal of the first sensor, when the first input object is input in the first input region,
wherein the interface controller controls, using the axis and the endpoint of the first input object, the proximity motion interface to dispose the at least one predetermined icon along a perimeter of an area in which the display is obscured by the first input object, in response to the first input object being input in the first input region.

13. The apparatus of claim 12, wherein the interface controller controls the proximity motion interface to change sizing of the at least one predetermined icon.

14. The apparatus of claim 1, further comprising:
input sensing units to determine whether input objects, comprising the first and second input objects, are sensed, based on at least one of an output signal of the first sensor and an output signal of the second sensor; and
an input selector to select at least one of the input objects based on a predetermined mode, in response to the input sensing units determining that the input objects are sensed.

15. The apparatus of claim 14, wherein the predetermined mode comprises a mode in which the input objects are received, a mode in which an input object most proximate to the reference surface is selected, and a mode in which an input object is selected when a position indicated by the input object is most proximate to a predetermined position above the reference surface.

16. The apparatus of claim 14, wherein the interface controller controls sizing of the at least one predetermined icon based on a proximity between at least one input object and the reference surface.

17. The apparatus of claim 14, further comprising:
a display to display a proximity motion interface;
a signal processor to extract an axis and an endpoint of at least one input object based on an output signal of the first sensor, in response to the at least one input object being sensed in the first input region; and
an interface controller to control the proximity motion interface to dispose at least one predetermined icon along a perimeter of a point indicated by at least one of the input objects, in response to the at least one input object being sensed in the second input region, and to control, using the axis and the endpoint of the at least one input object, the proximity motion interface to dispose the at least one predetermined icon along a perimeter of an area in which the display is obscured by the at least one input object, in response to the at least one input object being sensed in the first input region.

18. The apparatus of claim 1, further comprising:
an input pattern recognizer to recognize an input pattern based on at least one of an output signal of the first sensor and an output signal of the second sensor; and
a function performer to perform a function corresponding to the input pattern.

19. The apparatus of claim 18, wherein:
the input pattern recognizer comprises:
a calculator to calculate at least one of a velocity and an angular velocity of the first input object, based on at least one of the output signal of the first sensor and the output signal of the second sensor, and
the function performer comprises:
a detector to detect a function corresponding to the input pattern, based on a result of the calculating.

20. The apparatus of claim 1, further comprising:
a display to provide a two-dimensional (2D) interface and a three-dimensional (3D) interface;
a calculator to calculate at least one of a position, a velocity, and an angular velocity of the first input object, based on at least one of an output signal of the first sensor and an output signal of the second sensor; and
a display controller to control an operation mode of the display based on a result of the calculating.

21. An apparatus for recognizing a proximity motion using sensors, the apparatus comprising:
sensors, operatively connected and comprising:
a first sensor configured to sense a first input region at a distance closer than a predetermined distance from a reference surface for recognizing a proximate motion, and
a second sensor simultaneously operable with the first sensor and configured to sense a second input region at a distance farther than the predetermined distance from the reference surface, wherein the second sensor senses a rate of change of light of each pixel over time;
an information transfer controller to transfer information between the first sensor and the second sensor, the information related to a transition of first input object in response to the transition occurring between the first input region and the second input region;
a display to display a proximity motion interface;
an interface controller to control the proximity motion interface for at least one predetermined icon to be disposed along a perimeter of a point indicated by a second input object, when the second input object is input in the second input region; and a signal processor to extract an axis and an endpoint of the first input object based on an output signal of the first sensor, in response to the first input object being input in the first input region, wherein the interface controller controls, using the axis and the endpoint of the first input object, the proximity motion interface to dispose the at least one predetermined icon along a perimeter of an area of the interface in which the display is obscured by the first input object, in response to the first input object being input in the first input region.

22. The apparatus of claim 21, wherein the interface controller controls sizing of the at least one predetermined icon based on the proximity between the first input object and the reference surface.

23. An apparatus for recognizing a proximity motion using sensors, the apparatus comprising:

sensors, operatively connected and comprising:
  a first sensor configured to sense a first input region at a distance closer than a predetermined distance from a reference surface for recognizing a proximate motion;
  a second sensor simultaneously operable with the first sensor and configured to sense a second input region at a distance farther than the predetermined distance from the reference surface, wherein the second sensor senses a rate of change of light of each pixel over time;

an information transfer controller to transfer information between the first sensor and the second sensor, the information related to a transition of an input object, in response to the transition occurring between the first input region and the second input region;

sensing units to determine whether input objects are sensed, based on at least one of an output signal of the first sensor and an output signal of the second sensor;

an input selector to select at least one of the input objects based on a predetermined mode, in response to the input sensing units determining that the input objects are sensed;

a display to display a proximity motion interface;

a signal processor to extract an axis and an endpoint of at least one input object based on an output signal of the first sensor, in response to the at least one input object being sensed in the first input region; and an interface controller to control the proximity motion interface to dispose at least one predetermined icon along a perimeter of a point indicated by at least one of the input objects, in response to the at least one input object being sensed in the second input region, and to control, using the axis and the endpoint of the at least one input object, the proximity motion interface to dispose the at least one predetermined icon along a perimeter of an area in which the display is obscured by the at least one input object, in response to the at least one input object being sensed in the first input region.

24. A method of recognizing a proximity motion using each of operatively connected sensors, the method comprising:

sensing, using a first sensor, an off-surface first input region in response to a first input object being present in the first input region at a distance closer than a predetermined distance off of a reference surface for recognizing a proximity motion of the first input object off of the reference surface;

sensing, using a second sensor, a second input region the first input object is present in the second input region at a distance farther than the predetermined distance from the reference surface, and sensing a rate of change of light of each pixel over time, the second sensor being simultaneously operable with the first sensor; and transferring, between the first sensor and the second sensor, information related to a transition of the first input object in response to the transition occurring between the first input region and the second input region.

25. The method of claim 24, further comprising:
measuring a proximity between the first input object and the reference surface; and
selectively activating the first sensor and the second sensor, based on the measured proximity.

26. The method of claim 25, wherein the selective activation includes controlling the second sensor to transition from an active mode to a standby mode or inactive mode, and controlling the first sensor to transition from the inactive or the standby mode to the active mode, in response to the first input object being determined to be transitioning into the first input region from the second input region based on the measured proximity.

27. The method of claim 25, wherein the selective activation includes controlling the first sensor to transition from an active mode to a standby mode or inactive mode, and controlling the second sensor to transition from the inactive or the standby mode to the active mode, in response to the first input object being determined to be transitioning into the second input region from the first input region based on the measured proximity.

28. The method of claim 24, wherein the information related to the transition comprises an x-coordinate and a y-coordinate of the first input object being sensed in at least one of the first input region and the second input region.

29. The method of claim 24, wherein:
the first sensor senses and indicates a three-dimensional location, including sensed x, y, and z-coordinates, of the first input object in the first input region, and
the second sensor senses and indicates a two-dimensional location, including sensed x and y-coordinates, of the first input object in the second input region.

30. The method of claim 24, wherein:
the first sensor comprises a touch sensor to distinguish between a touching of the reference surface by the first input object and sensing within the first input region, and
the second sensor comprises a vision sensor, and indicates a two-dimensional location of the first input object based on a captured depth image.

31. The method of claim 24, further comprising:
controlling a proximity motion interface to change sizing of an area indicated by the first input object based on a proximity between the first input object and the reference surface, in response to the first input object being input in the first input region; and
displaying the proximity motion interface.

32. The method of claim 31, wherein:
the proximity motion interface comprises at least one icon, and
the controlling comprises:
controlling, in response to the at least one icon corresponding to an icon indicated by the first input object, the proximity motion interface to increase a size of the icon as the proximity between the first input object and the reference surface increases; and controlling, in response to the at least one icon corresponding to the icon indicated by the first input object, the proximity motion interface to select the icon, in response to the first input object being in contact with the reference surface.

33. The method of claim 24, further comprising:
controlling a proximity motion interface to dispose at least one predetermined icon along a perimeter of a point indicated by a second input object, in response to the second input object being input in the second input region; and
displaying the proximity motion interface.

34. The method of claim 33, further comprising:
extracting an axis and an endpoint of the first input object based on an output signal of the first sensor, in response to the first input object being input in the first input region,
wherein the controlling comprises controlling, using the axis and the endpoint of the first input object, the proximity motion interface to dispose the at least one predetermined icon along a perimeter of an area in which the display is obscured by the first input object, in response to the first input object being input in the first input region.

35. The method of claim 24, further comprising:
determining whether input objects, comprising the first input object and the second input object, are sensed, based on at least one of an output signal of the first sensor and an output signal of the second sensor; and
selecting at least one of the input objects based on a predetermined mode, in response to the input sensing units determining that the input objects are sensed.

36. The method of claim 35, wherein the predetermined mode comprises a mode in which the input objects are received, a mode in which an input object most proximate to the reference surface is selected, and a mode in which an input object is selected in response to a position indicated by the input object being most proximate to a predetermined position above the reference surface.

37. The method of claim 24, further comprising:
calculating at least one of a velocity and an angular velocity of the first input object, based on at least one of the output signal of the first sensor and the output signal of the second sensor; and
performing a function corresponding to the input pattern, based on the calculation.

38. The method of claim 24, further comprising:
calculating at least one of a position, a velocity, and an angular velocity of the first input object, based on at least one of an output signal of the first sensor and an output signal of the second sensor; and
switching an operation mode of a display between a two-dimensional (2D) interface and a three-dimensional (3D) interface, based on the calculation.

39. A non-transitory computer-readable medium comprising a program for instructing a computer to perform the method of claim 24.

40. A method of recognizing a proximity motion using each of operatively connected sensors, the method comprising:

sensing, using a first sensor, a first input region in response to a first input object being present in the first input region at a distance closer than a predetermined distance from a reference surface for recognizing a proximity motion;
sensing, using a second sensor, a second input region when the first input object is present in the second input region at a distance farther than the predetermined distance from the reference surface, and sensing a rate of change of light of each pixel over time, the second sensor being simultaneously operable with the first sensor;
transferring, between the first sensor and the second sensor, information related to a transition of the first input object in response to the transition occurring between the first input region and the second input region;
controlling a proximity motion interface to dispose at least one predetermined icon along a perimeter of a point indicated by a second input object, in response to the second input object being input in the second input region;
displaying the proximity motion interface; and
extracting an axis and an endpoint of the first input object based on an output signal of the first sensor, in response to the first input object being input in the first input region,
wherein the controlling comprises controlling, using the axis and the endpoint of the first input object, the proximity motion interface to dispose the at least one predetermined icon along a perimeter of an area in which the display is obscured by the first input object, in response to the first input object being input in the first input region.

41. A method of controlling a user interface device using each of operatively connected sensors, the method comprising:
controlling the user interface device to actuate a first sensor to sense for an input in a first off-surface region off of a touch input surface of the user interface device;
controlling the user interface device to actuate a second sensor to sense for an input in a second off-surface region measured from the touch input surface, and farther away from the touch input surface than the first region, and sense a rate of change of light of each pixel over time, the second sensor being simultaneously operable with the first sensor;
actuating an information transfer controller to transfer information between the first sensor and the second sensor, the information related to a transition of the first input object in response to the transition occurring between the first input region and the second input region; and
selectively controlling a user interface of the user interface device in a first manner and a second manner based on at least one of a position and a movement of the sensed input within the first region and the second region.

* * * * *